United States Patent [19]

Stäble et al.

[11] 4,226,482
[45] Oct. 7, 1980

[54] BRAKE ACCELERATOR FOR A FLUID PRESSURE BRAKE SYSTEM

[75] Inventors: Georg Stäuble; Josef Hintner, both of Munich, Fed. Rep. of Germany

[73] Assignee: Knorr-Bremse GmbH, Munich, Fed. Rep. of Germany

[21] Appl. No.: 900,583

[22] Filed: Apr. 27, 1978

Related U.S. Application Data

[63] Continuation of Ser. No. 759,044, Jan. 13, 1977, abandoned.

[30] Foreign Application Priority Data

Oct. 20, 1976 [DE] Fed. Rep. of Germany ....... 2647283

[51] Int. Cl.³ .................................................. B60T 17/04
[52] U.S. Cl. ........................................... 303/82; 303/37
[58] Field of Search ................... 303/36, 37, 38, 68, 303/69, 70, 74, 80, 82, 83

[56] References Cited

U.S. PATENT DOCUMENTS

| | | | |
|---|---|---|---|
| 1,964,071 | 6/1934 | Neveu | 303/68 |
| 2,024,653 | 12/1935 | McCune | 303/82 |
| 2,812,985 | 11/1957 | Thomas et al. | 303/68 |
| 3,716,276 | 2/1973 | Wilson et al. | 303/82 |
| 3,988,044 | 10/1976 | Hill | 303/82 |
| 3,994,536 | 11/1976 | Prada | 303/74 |

FOREIGN PATENT DOCUMENTS

| | | | |
|---|---|---|---|
| 702652 | 1/1941 | Fed. Rep. of Germany | 303/74 |
| 972696 | 10/1964 | United Kingdom | 303/83 |
| 972825 | 10/1964 | United Kingdom | 303/83 |

Primary Examiner—Edward R. Kazenske
Attorney, Agent, or Firm—Edmund M. Jaskiewicz

[57] ABSTRACT

A brake accelerator is operable sequentially upon each successive braking stage over the service application range of brake line pressure reductions and is employed with a single release brake control valve of an indirectly acting compressed air brake for railway vehicles. The control valve has a service brake portion and an emergency brake portion provided with a emergency brake piston one side of which is subjected to brake line pressure and the other side is subjected to auxiliary chamber pressure. The accelerator has a main piston which operates an inlet valve to connect the accelerator to the brake line. The main piston which is also subjected on one side to brake line pressure and the other side to auxiliary chamber pressure is moved to a service position upon an application of the brakes to open the inlet valve and connect a control piston with the brake line such that the control piston is subjected on both sides to brake line pressure. The control piston is repeatedly moved between two positions such that quantities of air are cyclically withdrawn from the brake line and the auxiliary chamber to maintain the pressure relationship existing on both sides of the main piston during the service application. The drawing off of air from the auxiliary chamber by the control piston is carried out separately and independently from venting of the auxiliary chamber by the emergency brake piston.

11 Claims, 4 Drawing Figures

BRAKE ACCELERATOR FOR A FLUID PRESSURE BRAKE SYSTEM

This is a continuation of application Ser. No. 759,044 filed Jan. 13, 1977, now abandoned.

The present invention relates to a brake accelerator operable during each braking stage and associated with a brake control valve of an air brake system for railway vehicles, more particularly, to such an accelerator which cyclically draws off predetermined quantities of air from the brake line and an auxiliary chamber and the drawing off of the auxiliary chamber air is separate from venting of the auxiliary chamber by the emergency brake piston.

Each railway vehicle of a train of vehicles is provided with a brake control valve device connected to the brake line extending throughout the length of the vehicle. The interconnected brake lines of coupled railway vehicles thus form a brake line extending throughout the length of the train and the pressure in this brake line is regulated by the train operator thru a control valve in order to brake the train. During a braking operation, the operator generally applies the braking in stages so that there is an initial light reduction in brake line pressure and subsequent further reductions to provide the proper degree of braking. This braking is accomplished thru a service brake portion of the control valve. Each control valve is further provided with an emergency brake portion by means of which a rapid decrease in brake line pressure is achieved to bring about emergency braking.

Such brake control valves have also been provided with an accelerator device, generally on the emergency portion, which actuates the control device to achieve a quick and uniform drop in pressure during service braking, even though some of the vehicles may not have quick service valves or the vehicles may be of different sizes so as to have different volumes of air in their brake air lines.

One form of an accelerator device is associated with a brake control valve having an emergency braking portion with an emergency brake piston therein one side of which is subjected to brake line pressure and the other side subjected to pressure from an auxiliary chamber connected to the brake line thru a constriction. In the service braking position, the emergency brake piston regulates the connection of the auxiliary chamber to the atmosphere thru a vent in order to maintain a pressure relationship between the auxiliary and brake line pressures acting upon opposed faces of the emergency brake piston at such a value that the brake line pressure drop does not exceed a predetermined value. When the emergency brake piston is moved from its service braking position into the emergency braking position in order to achieve a rapid braking action, the venting of the auxiliary chamber to the atmosphere is also controlled to maintain the pressure differential between the brake line and auxiliary chamber pressures occurring during the emergency braking when the brake line pressure drop exceeds a predetermined value. The accelerator which is controlled by the pressure relationship between the brake line and auxiliary chamber draws off additional limited quantities of air from the brake line in order to compensate for any flattening of the brake line pressure during service braking because of friction losses in the brake line. The accelerator also withdraws corresponding amounts of air from the chamber in order to maintain the above pressure differential.

The above mentioned brake accelerator device associated with a single release brake control valve for indirect acting compressed airbrakes of railway vehicles is disclosed in U.S. Pat. No. 3,716,276. This accelerator has the disadvantage in that should a defect occur in the accelerator they may result a buildup in auxiliary chamber pressure which may initiate an unintentional emergency braking action.

It is therefore the principal object of the present invention to provide a novel and improved accelerator device for a fluid pressure braking system which is operative at each stage of service braking.

It is another object of the present invention to provide such a brake accelerator which will not bring about an emergency braking action should there be any defect in the accelerator.

A further object of the present invention is to provide such a brake accelerator which can be readily added at a minimum of expense to a single-release brake control valve, and particularly to the emergency brake portion of such a control valve that includes a service brake portion.

It is an additional object of the present invention to provide such a brake accelerator which can be readily installed upon existing brake control valves with a minimum of structural changes on the control valves.

The present invention essentially comprises a brake accelerator which is connected to the brake line by an inlet valve controlled by a main piston subjected to brake line pressure on one side and auxiliary chamber pressure on the other side. A control piston in the accelerator is connected to the brake line thru the opened inlet valve and subjected to the action of brake line pressure on both sides thereof. The control piston regulates drawing off quantities of brake line and auxiliary chamber air to the atmosphere. The drawing off of the auxiliary chamber air is separated from the venting of the auxiliary chamber by the emergency brake piston during service braking.

According to one aspect of the present invention a main cylinder has one side subjected to brake line pressure and the other subjected to auxiliary chamber pressure and the brake line side of the piston is connected by first passage means to a second chamber in which is positioned a control piston having an orifice there-thru so that both sides of the control piston are subjected to brake line pressure when a valve in the first passage means is opened when the main piston is in the service position. The control piston actuates means for drawing off a predetermined quantity of air from the brake line when the main piston is in the service position. Additional means are also actuated by the control piston for drawing off to the atmosphere a corresponding quantity of air from the auxiliary chamber when the main piston is in the service position in order that a predetermined pressure relationship is maintained on both sides of the main piston.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
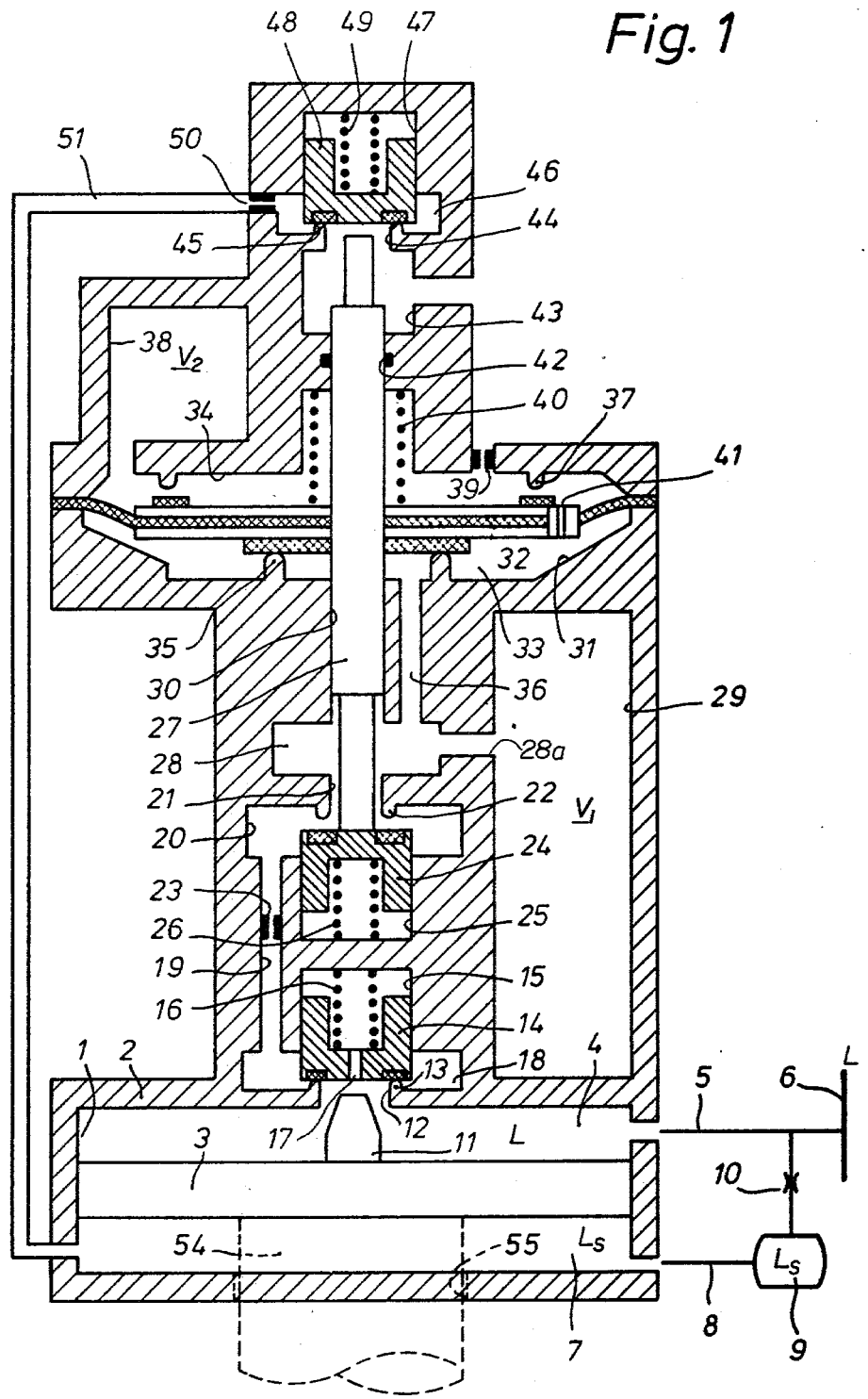
FIG. 1 is a sectional view illustrating schematically the brake accelerator according to the present invention.

As may be seen in FIG. 1, the accelerator has a valve housing 2 in which is formed a cylindrical chamber 1 within which is slidably positioned a main piston 3 the peripheral edge of which is sealed such that pressure tight sub-chambers 4 and 7 are formed on both sides of the piston. Sub-chamber 4 is connected by a pipe 5 to a brake line 6 with the pressure L and sub-chamber 7 is connected thru a pipe 8 to an auxiliary chamber 9 which in turn is connected to the brake line 6 through a throttle connection 10.

The side of the piston 3 opening into sub-chamber 4 is provided with a centrally located plunger 11 which extends into a central opening 12. The opening 12 is provided with a valve seat 13 engageable by a valve member 14 to form an inlet valve 13, 14 which is closed when the valve member 14 is in the position as shown in FIG. 1 and which is opened upon displacement of the piston 3 such that the plunger 11 engages the valve member 14 and moves the valve member upwardly.

The valve member 14 is slidably guided in a cylindrical housing recess 15 and sealed against pressure losses. A spring 16 in the housing 15 loads the valve member 14 against valve seat 13. The valve member is provided with a bore 17 thru which opening 12 and sub-chamber 4 are constantly connected to the housing recess 15 enclosed by the valve member 14.

The valve seat 13 projects into a valve chamber 18 from which a passage 19 leads to a further valve chamber 20 in which is formed a central opening 21 around which is positioned a valve seat 22 projecting into the valve chamber 20. The passage 19 is provided with an orifice or constriction 23. A valve member 24 in the form of a piston is slidably and sealingly received in a cylindrical recess 25 and is loaded by a spring 26 toward valve seat 22. Valve member 24 and valve seat 22 together form valve 22, 24.

In the positions of the components as illustrated in FIG. 1, the valve member 24 is attached to the lower end of a plunger 27 which extends thru opening 21 above which is formed a recess or chamber 28 connected by passage 28a to a control chamber 29 having a volume $V_1$. The recess 28 is connected by a central bore 30 to a valve chamber 31. The plunger 37 extends thru the recess 28 and is slidably guided in bore 30 and is securely attached to a diaphragm piston 32 positioned in a valve chamber 31 so as to divide this valve chamber into sub-chambers 33 and 34.

In the lower sub-chamber 33 a valve seat 35 surrounds the bore 30 and encloses a surface $F_{35}$ which can be closed by the lower face of the diaphragm 32 so as to form a valve 32, 35. A passage 36 connects the recess 28 with the space enclosed by the valve seat 35.

In the upper sub-chamber 34 there is a further valve seat 37 which is concentric with valve seat 35 and encloses a surface $F_{37}$ which is greater in area than the surface $F_{35}$. Valve seat 37 can be closed by the upper face of diaphragm piston 32 so as to define a further valve 32, 37. Radially outwardly of valve seat 37, the sub-chamber 34 is connected to a second control chamber 38 having a control volume $V_2$. In the portion of the housing wall enclosed by the valve seat 37 there is provided a throttle or contriction 39 which connects sub-chamber 34 to the atmosphere.

A spring 40 acts upon the upper face of diaphragm piston 32 to lower the piston 32 toward valve seat 35. Radially outwardly of the central diaphragm surface employed for closing valve seat 37, there is provided in the piston 32 an orifice 41 thru which control chamber 38 is in constant communication with the sub-chamber 33 even when valve 32, 37 is closed.

Sub-chamber 34 is provided with a central opening 42 through which the plunger 27 is slidable received and projects into a chamber 43 which is open to the atmosphere. The chamber 43 comprises a central opening 44 around which is formed a valve seat 45 projecting into a valve chamber 46. The valve chamber 46 is provided with a cylindrical recess 47 for slidably receiving a valve piston member 48 which is engagable with valve seat 45 to form a valve 45, 48. A spring 49 in the recess 47 urges the valve member 48 toward valve seat 45. The upper end of the plunger 27 freely projects into the central opening 44 and upon upward displacement of diaphragm piston 32 the plunger 27 can lift valve member 48 from its valve seat 45 against the force of spring 49.

The valve chamber 46 is connected with the lower piston sub-chamber 7 through an orifice 50 and a pipe 51.

The main piston 3 is movable between three different positions, as follows:

1. In FIG. 1, the piston 3 is illustrated in a mid-position which is its initial or release position in which valve 13, 14 is closed and the brake line pressure L in sub-chamber 4 is equal to the auxiliary chamber pressure $L_s$ in sub-chamber 7 such that $L = L_s$.
2. The service brake position in which the main piston 3 is displaced upwardly into an intermediate position wherein valve 13, 14 is opened. In this position, $L < L_s$ and the L-pressure drop does not fall below a predetermined value during a service braking operation.
3. The emergency brake position wherein main piston 3 is moved further upwardly to its upper end position in which position the pressure relationship $L << L_s$ and the L-pressure rapidly drops to zero.

OPERATION OF THE ACCELERATOR DEVICE

When the brakes of the vehicle are in the release position a pressure equilibrium exists in the piston sub-chambers 4 and 7 such that the brake line pressure L equals pressure $L_s$ in the auxiliary chamber 9. Main piston 3 will be in its mid-position as illustrated, the valve 13, 14 is closed and the brake accelerator device is inoperative.

Upon initiating a service braking action, a predetermined decrease of pressure per unit time occurs in brake line 6 which decrease is controlled in a known manner from the operator's brake valve. The pressure drop in the brake line does not exceed a certain predetermined value since if this value were exceeded a rapid braking action would occur in a known manner by means of the emergency brake piston. Thus, during service braking in order to maintain the same pressure drop throughout the entire length of the train and on every vehicle and to maintain this pressure drop equal to the drop in the brake line as introduced by the operator's brake valve, and in order to avoid any flattening or variations in the pressure drop from vehicle to vehicle because of friction losses in the brake line, the brake accelerator of FIG. 1 draws off a limited quantity of air from the brake line on every vehicle. This quantity of air is such as to eliminate any flattening or variation of the pressure drop between vehicles of the train because of friction losses in the brake line. At the same time, however, this quantity of drawn off air must not be sufficient to initiate a rapid braking action.

During the service braking action corresponding quantities of air must also be drawn from the auxiliary chamber 9 in order to maintain the pressure relationship $L/L_s$ such that the emergency brake piston is not shifted into the emergency braking position.

Upon initiating a service braking operation, pressure is lowered in the brake line 6 and at the same time pressure L in sub-chamber 4 is lowered with respect to pressure $L_s$ in sub-chamber 7. As result of the pressure difference $L_s-L$, the main piston 3 will be displaced into the service brake position wherein the plunger 11 will open the valve 13, 14 against the force of spring 26. The air will thus pass from brake line 6 thru sub-chamber 4 and open valve 13, 14 into valve chamber 18 and thru passage 19 having the constriction 23 and then into the valve chamber 20. At the beginning of a service braking operation, the diaphragm piston 32 is pressed by spring 40 against valve seat 35 and the plunger 26 on the diaphragm piston 32 is in its lower most position as shown in FIG. 1 wherein valve 22, 24 is maintained by the plunger in its open position against the force of spring 26. Consequently, the air passes from valve chamber 20 thru recess 28 and into control chamber 29 and subsequently thru passage 36 under the closed valve seat 35. When the pressure in control chamber 29 is increased to a sufficient value $P_{29}$, the surface of diaphragm piston 32 enclosed by the valve seat 35 will be urged away from valve seat 35 against the force of spring 40. The pressure from chamber 29 acts suddenly on the entire lower surface of the diaphragm piston 32 and as a result the piston snaps into its upper most position in which the piston is seated upon valve seat 37.

The upward movement of diaphragm piston 32 also carries the plunger 27 upwardly such that the valve 22, 24 is closed under the force of spring 26. The closing of valve 22, 24 blocks any further increase of pressure in control chamber 29 and the air in chamber 29 flows thru duct 36, opened valve 32, 35 into the valve chamber 33 and thru orifice 41 into the control chamber 38. The space defined by the diaphragm piston 32 seated upon valve seat 37 remains vented to the atmosphere thru orifice 39. Thus, only the annular surface of the diaphragm piston 32 outwardly of valve seat 37 is subjected to the action of pressure from control chamber 29. However, when the pressure in control chamber 38 increases to a value $P_{38}$, the diaphragm piston 32 assisted by the force of spring 40 is separated from valve seat 37 and the pressure from control chamber 38 acts upon the entire upper surface of the diaphragm piston 32. As result, the piston 32 is suddenly and quickly returned into its lower starting position in which the valve seat 35 is again closed.

The closing of valve 35, 32 again blocks the communication between control chambers 29, 38 thru the orifice 41 and control chamber 38 will be vented thru orifice 39 to the atmosphere together with the valve chamber 34. The movement of diaphragm piston 32 into its lower position also displaces the plunger 27 downwardly which opens valve 22, 24 against the force of spring 26.

The above described sequence of operations for drawing off a quantity of air from sub-chamber 4 until pressure $P_{29}$ is reached, subsequently switching the diaphragm piston 32, then venting chamber 29 thru orifice 41 until the pressure is increased to $P_{38}$ and then venting control chamber 38 thru orifice 39 released by diaphragm piston 32 is repeated cyclically as long as the main piston 3 is in the service brake position in which position the inlet valve 13, 14 is maintained in the opened position by the action thereon of plunger 11.

As discussed above, the emergency brake piston produces a rapid or emergency braking action only when the operator's brake valve introduces such a decrease of pressure for unit time in the brake line that the pressure drop in the brake line falls below a certain predetermined value. The emergency brake piston which is subjected on one side to brake line pressure L and on the other side to auxiliary chamber pressure $L_s$ is shifted from its service braking position into the emergency braking position only when the decrease of pressure L per unit time as controlled by the operator's brake valve is greater than the decrease of pressure $L_s$ per unit time as controlled in parallel by the emergency brake piston thru an orifice. As result, a pressure difference $L_s$-L is established on the emergency brake piston which causes the piston to be displaced into its emergency braking position. The emergency brake piston is thus displaced into its emergency braking position to initiate a rapid braking action only when the decrease of pressure $L_s$ per unit time in auxiliary chamber 9 ocurring simultaneously with the decrease of pressure L and brake line 6 does not correspond to or is slower than the decrease pressure L per unit time in brake line 6. In order to avoid any modification of the pressure relationship $L/L_s$ on the emergency brake piston during a service braking operation wherein air from brake line 6 is cyclically tapped thru orifice 39 in the accelerator device, the accelerator device according to the present invention draws out a corresponding quantity of air from auxiliary chamber 9 during each quantity of air drawn from the brake line 6 thru orifice 39. According to the present invention the accelerator device is provided with the valve 45, 48 together with the throttle opening 50 and pipe 51 between the sub-chamber 7 and the valve chamber 46.

When the diaphragm piston 32 is in its upper or service position, in which valves 22, 24 and 32, 37 are closed and plunger 27 is also in its upper position wherein the upper end of the plunger 27 opens valve 45, 48 against the force of spring 49. The air from sub-chamber 7 under the piston 3 will then escape into the atmosphere thru pipe 51, throttle opening 50, opened valve 45, 48 and chamber 43 until the diaphragm piston 32 is switched back to its lower position under the action of pressure $P_{38}$ in the control chamber 38. The downward displacement of piston 32 will also move the plunger 27 downwardly where upon the valve 45, 48 will again be closed under the force of spring 49.

Thus, quantities of air are withdrawn from auxiliary chamber 9 anticyclically to the withdrawing of air from brake line 6 thru orifice 39 such that the pressure ratio $L/L_s$ acting on the emergency brake piston is not varied by the lowering of pressure in the brake line 6 as brought about by the brake accelerator during a service braking operation.

The frequency and the quantity of air drawn off from brake line 6 and auxiliary chamber 9 are determined by the sizes of the throttle openings 23, 39, 41 and 50, the volumes of the control chambers 29 and 38, the areas enclosed by the valve seats 35 and 37 and the forces of the springs acting upon the diaphragm piston 32. Throttle opening 23 thus determines the time necessary for establishing control pressure $P_{29}$ in control chamber 29 which permits the diaphragm piston 32 to be switched from its lower position into its upper position against the force of spring 41. Upon the switching into the upper position the orifice 41 determines the time required to establish control pressure $P_{38}$ in control chamber 38 which then brings about the switching of the piston 32 into its lower or starting position assisted by the force of spring 40.

A definite quantity of air is withdrawn from brake line 6 thru orifice 39 and a definite quantity of air is withdrawn from auxiliary chamber 9 thru the throttle opening 50.

The cyclic withdrawing of air from brake line 6 and auxiliary chamber 9 carried out by the accelerator device in relatively small quantities can occur at a relatively high frequency of, e.g., 1 Hz. This cyclic tapping or withdrawing of air will continue as long as the main piston 3 is located in the service braking position.

It should be borne in mind that a cyclic tapping or withdrawing of air as described above at a relatively high frequency will produce an almost identical average decrease of pressure in the brake line in every railway vehicle during each stage of service braking.

According to the present invention, the main piston 3 of the accelerator as illustrated in FIG. 1 can be connected in parallel with a known emergency brake piston. Also, the main piston 3 may be constructed as the emergency brake piston. When the main piston 3 is the emergency brake piston, there is provided a piston rod 54 indicated by the dashed lines in FIG. 1 which is sealingly and slidably positioned within a central opening 55 in the housing 2. The emergency brake piston 3 is thus correspondingly subjected to the action of pressure from brake line 6 on one side thereof and the action of pressure in auxiliary chamber 9 on the other side thereof. When a service braking operation is initiated by suitable actuation of the operator's brake valve, the pressure in the brake line 6 will be lowered a predetermined amount in accordance with the introduced braking stage. Accordingly, the pressure relationship $L/L_s$ on the emergency brake piston will be varied. The emergency brake piston (main piston 3) is now shifted into the service braking position and its piston rod 54 will open a venting path leading from auxiliary chamber 9 and the path contains the throttle opening, the path structure is not illustrated.

As long as the decrease of pressure per unit time as determined by such a throttle opening can follow the decrease of pressure per unit time as introduced by the operator's brake valve in the brake line 6, the emergency brake piston will remain in its service position. If the pressure drop in the brake line exceeds a predetermined value, the emergency brake piston will then be pressed beyond the service brake position into the emergency brake position which is its upper limit position. In this position, the piston rod 54 will actuate a rapid or emergency braking action in a manner as known in the art.

When the main piston 3 is constructed as the emergency piston it then performes a double function. During a service braking operation, the piston 3 will control with its piston rod the throttle venting of auxiliary chamber 9 and will introduce a rapid braking action should emergency braking be initiated. As a second function, the emergency brake piston will control the brake accelerator of the invention during service braking.

Figure 2B:
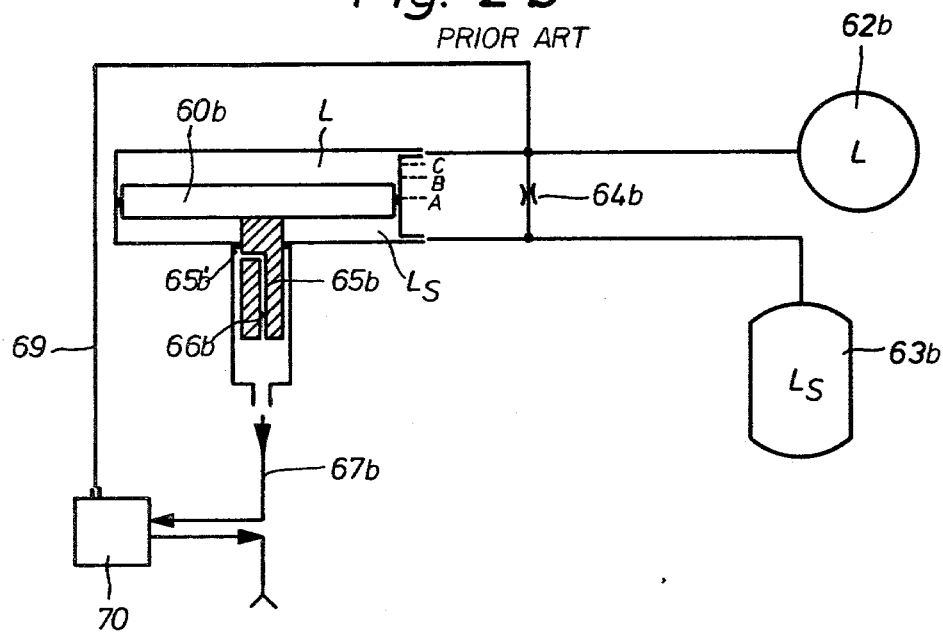
FIGS. 2a and 2b are schematic diagrams of prior art brake accelerators which are controlled by an emergency brake piston.
Figure 2A:
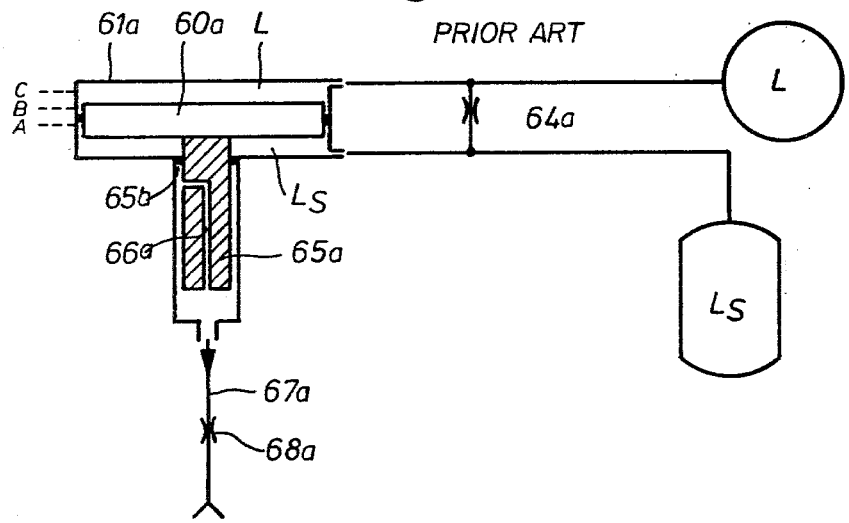
Figure 3:
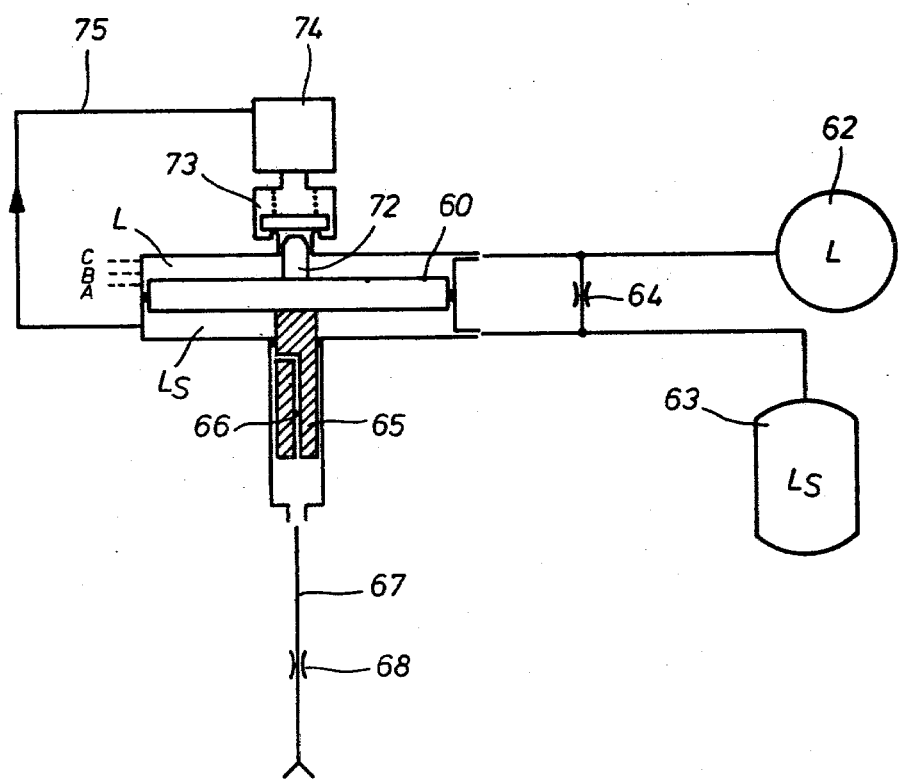
FIG. 3 is a schematic diagram of the brake accelerator of the present invention controlled by an emergency brake piston.

The brake accelerator of the present invention is illustrated in FIG. 3 as controlled by an emergency brake piston and prior art brake accelerators are illustrated in FIGS. 2a and 2b also showing brake accelerators controlled by an emergency brake piston. The emergency brake pistons of FIGS. 2a, 2b and 3 are all associated with known emergency brake portions which jointly with a service brake portion constitutes a two-pressure control valve for a single stage releasing, indirectly acting compressed air brake of railway vehicles. The service brake portion controls service braking operations and the emergency brake portion controls rapid braking actions as known in the art. In addition, the emergency brake pistons each controls a brake accelerator that is effective during each stage of service braking.

In FIGS. 2a, 2b and 3 corresponding parts are designated with the same reference numerals and the reference numerals 2a and 2b are followed by corresponding letter symbols to indicate particular Figures of the drawings.

In FIG. 3, the emergency brake piston 60 is slidably positioned in a cylindrical housing 61 such that the piston 60 is subjected on one side thereof to compressed air from a brake line 62 at a pressure L and its other side is subjected to the action of compressed air from an auxiliary chamber 63 having a pressure therein of $L_s$. The chamber 63 is connected to the brake line thru a throttle opening 64.

The emergency brake piston 60 is provided with a piston rod 65 on the side of piston 60 subjected to pressure $L_s$ and sealingly and slidably guided in a central opening 65' in the housing 61. The piston rod 65 is provided with a longitudinally extending passage 66 which extends transversely at its upper end to open laterally to the outer surface of the rod 65 adjacent the upper end of the piston rod.

The emergency brake pistons in FIGS. 2a, 2b and 3 are each shown in a central starting position A in which the pressures L and $L_s$ are equal. The piston 60 is in this position when the brakes are in the release position during operation of a railway vehicle. If the operator should actuate the brake control valve in order to introduce service braking in the structure of FIG. 2a, the pressure in the brake line 62 will be decreased at a certain pressure gradient. The emergency brake piston 60a under the action of a pressure $L_s$ which is greater than the pressure L will be shifted into the service position B in which the inlet of passage 66a in the piston rod 65a is connected to the sub-chamber subjected to the action of pressure $L_s$. As a consequence of the decrease of pressure L in the housing 61a, air under pressure $L_s$ is continuously drawn off into the atmosphere thru passage 66a and a pipe 67a having a throttle opening 68a therein. As result of the drawing off of $L_s$ air, the piston 60a will remain in the service position B until an emergency braking action is introduced or the brakes are released. During an emergency braking action, the pressure drop in the brake line will be so steep that the pressure $L_s$ will not be able to drop so rapidly thru the throttle 68a so as to maintain the piston 60a in its service position. Therefore, the higher $L_s$ pressure will shift the piston 60a into an emergency braking position C in which a rapid braking action will be produced.

The brake control structure of FIG. 2a has the disadvantage that as a pressure drop introduced during service braking is gradually decreased or flattened thru successive coupled vehicles because of friction losses in the brake line, the control valves on the individual railway vehicles throughout the length of the train will introduce decreasing brake pressures into the respective brake cylinders. The result is that the individual railway vehicles are not subjected to the same brake pressures and thus are not uniformly braked.

In order to overcome this disadvantage it was proposed to provide an accelerator device on every emergency portion of a railway vehicle control valve which accelerator was controlled by the emergency brake piston. Such a structure is shown in FIG. 2b and corresponds to that of U.S. Pat. No. 3,716,276. A brake accelerator device 70 is connected into the pipe 67b in order to decrease the pressure $L_s$ in the emergency piston sub-chamber. In addition, the accelerator 70 is connected to the brake line 62b thru a pipe 69.

During a service braking action, the emergency piston 60b will also be displaced into the service position B wherein the piston sub-chamber subjected to the action of pressure $L_s$ is connected to pipe 67b thru duct 66b in piston rod 65b. The brake accelerator 70 will thus become operative when air flows from auxiliary chamber 63b thru pipe 67b and the emergency brake piston 60b is in the service position B. In addition to a throttle for decreasing the pressure $L_s$ in accordance with the decrease of pressure L as introduced by the operator's brake valve, the accelerator 70 is provided with two additional throttles thru which a certain quantity of air is drawn from brake line 62b and a corresponding quantity of air is drawn from auxiliary chamber 63b in order to counteract any flattening of the pressure drop introduced by the operator's brake valve which flattening is caused by friction losses in the brake line. A diaphragm piston is provided for controlling the two additional throttles and this piston is subjected on one side to pressure L and on the other side to pressure $L_s$. A check valve is also inserted into the path of air flowing from auxiliary reservoir 63b to the atmosphere. As result, the brake accelerator 70 controlled by the $L_s$ air being withdrawn has the disadvantage that upon any accumulation of $L_s$ air which may occur as result of a defect in the accelerator will initiate an unintentional braking action. Such a disadvantage cannot occur in the brake accelerator of the present invention as shown in FIGS. 1 and 3.

The emergency brake piston 60 of the present invention as shown in FIG. 3 is provided with a plunger 72 which opens an inlet valve 73 of brake accelerator 74 when the piston 60 is in its service braking position. L air from brake line 62 will then flow thru the opened inlet valve 73 into the accelerator 74 to actuate the accelerator. Thus, the accelerator 74 of the present invention is not actuated in response to a drawing off of $L_s$ air but rather is actuated in response to opening of the inlet valve 73. The accelerator 74 has a control piston both sides of which are subjected to pressure L in order to control the additional tapping or withdrawing of both L and $L_s$ air. The additional withdrawing of $L_s$ air is achieved thru a pipe 75 which corresponds to the pipe 51 of FIG. 1.

The lowering of the pressure $L_s$ during a service braking action corresponding to the lowering of the pressure L as introduced by the operator's control valve is carried out separately thru the passage 66 in piston rod 65, pipe 67 and the throttle 68 therein as described in connection with FIG. 2a.

If any defect should occur in the brake accelerator of the present invention which may bring about a malfunctioning of the accelerator as result of which additional tapping of the L and $L_s$ air does not occur the actual decrease of the pressure $L_s$ thru pipe 67 and throttle 68 will not be affected. Thus, the brake accelerator disclosed herein is advantageous in that any defect in the brake accelerator which might bring about an accumulation of $L_s$ air would not displace the emergency brake piston into an emergency position so as to trigger a rapid braking action.

A further advantage of the brake accelerator of the present invention is that the accelerator need not be necessarily controlled by the emergency brake piston itself but, as described above can be controlled by an additional piston which is constructed in parallel with the emergency brake piston. The practical effect of this additional piston is that existing emergency brake pistons and their controls for lowering pressure $L_s$ as shown in FIG. 2a need not be modified nor changed in any way. The accelerator of the present invention having a main piston subjected to the action of L and $L_s$ pressures as described in connection with FIG. 1 can be installed upon the existing emergency brake portions having emergency brake pistons as schematicly illustrated in FIG. 2a. The necessary connections in the cylinder space of the main piston for L and $L_s$ air can then be readily provided as known in the art.

It is to be further pointed out that a standard existing emergency brake portion having an emergency brake piston as shown in FIG. 2a can relatively easily be provided with the accelerator device of the present invention by providing the emergency piston with the plunger 11 as shown in FIG. 1. The accelerator device is then installed upon the housing for the emergency piston chamber and positioned coaxially with the emergency brake piston. It is then only necessary to connect the pipe 51 of FIG. 1 to the auxiliary chamber 9.

Thus, it can be seen that the present invention has disclosed a brake accelerator which is simple in construction but has definite operating advantages and which can be installed upon existing brake control valves having emergency and service portions.

It will be understood that this invention is susceptible to modification in order to adapt it to different usages and conditions, and accordingly, it is desired to comprehend such modifications within this invention as may fall within the scope of appended claims.

What is claimed is:

1. A brake accelerator for a fluid pressure brake system having a brake line and an auxiliary chamber with a throttle connection to said brake line, and comprising first means for defining a first chamber having a first piston movable therein between first and second positions, said first piston defining on one side thereof a first sub-chamber connected to the brake line and on the other side thereof a second sub-chamber connected to said auxiliary chamber, said first piston being in the first position when a pressure equilibrium exists in the first and second sub-chambers during release position of the brakes and being in the second position when the pressure in said second sub-chamber is greater than in said first sub-chamber during a service braking operation, a control piston movable in a second chamber between first and second positions, said control piston defining on one side thereof a third sub-chamber and on the other side thereof a fourth sub-chamber, first passage means between said third sub-chamber and the first sub-chamber, a first valve in said first passage means operable between positions to open and close said first passage means with respect to said first sub-chamber, a second valve connecting said first passage means to said third sub-chamber when said second valve is in an open position, means for defining a first control chamber communicating with said first passage means, a third valve in said first passage means between said first valve and said first control chamber and movable between open and closed positions, second passage means in connection with said first passage means for drawing off pressure fluid from said first control chamber through said first passage means and said third sub-chamber to the atmosphere, third passage means communicating with said second sub-chamber, a fourth valve in said third passage means and movable between open and closed positions, second means connected to said third passage means for venting pressure fluid from said second sub-chamber when said fourth valve is open, third means for opening said first valve when said first piston is in its second position, fourth means for opening said third valve and for closing said second and fourth valves when said control piston is in its first position, said fourth means closing said third valve and opening said second and fourth valves when said control piston is in its second position, pressure fluid entering said first control chamber from the brake line upon opening of said first valve when a decrease in pressure occures in said brake line to increase pressure in said first control chamber such that the increased pressure acts upon said control piston in conjunction with said fourth means to open said second and fourth valves and to close said third valve whereby pressure fluid is drawn off to the atomosphere from said first control chamber and said second sub-chamber, said control piston in conjunction with said fourth means closing said second and fourth valves and opening said third valve when the pressure in said first control chamber drops below a predetermined valve so that a limited quantity of pressure fluid is drawn from said brake line and a predetermined pressure relationship is maintained on both sides of said first piston during a service braking operation.

2. A brake accelerator as claimed in claim 1 wherein said first piston comprises an emergency piston.

3. A brake accelerator as claimed in claim 2 wherein said third means comprises plunger means on the brake line side of said emergency piston, said first valve comprises a first valve seat around the opening of said first passage means to said first sub-chamber and a valve member engageable with said first valve seat, said valve member being engageable by said plunger means to operate said first valve.

4. A brake accelerator as claimed in claim 3 and fifth means for defining a second control chamber and a fifth valve between said second control chamber and said fourth sub-chamber, said control piston having its first position in which said fifth valve is opened, said first and second control chambers are closed from each other by said second valve being in its closed position and said second control chamber is vented to the atmosphere, said control piston further having its second position in which said fifth valve is closed, said first and second control chambers are opened to each other by said second valve being in its open position, and said second control chamber is blocked from venting.

5. A brake accelerator as claimed in claim 4 and further comprising constriction means in said first passage means between said first valve and said first control chamber.

6. A brake accelerator as claimed in claim 4 and further comprising second constriction means in said third passage means.

7. A brake accelerator as claimed in claim 4 wherein said control piston has an orifice therethrough and said fourth sub-chamber has a vent defining said second passage means.

8. A brake accelerator as claimed in claim 7 and further comprising second and third valve seats in said second chamber engageable by said control piston defining said second and fifth valves, respectively, said control piston in its first position engaging said second valve seat to close the connection between said first passage means and said third sub-chamber and in its second position engaging said third valve seat to close the vent of said second control chamber, said control piston orifice being disposed radially outwardly of said second and third valve seats to provide communication between said first passage means, said third sub-chamber and said second control chamber when said control piston is in its second position.

9. A brake accelerator as claimed in claim 8 wherein said second and third valve seats are on opposed sides of said control piston.

10. A brake accelerator as claimed in claim 8 and further comprising spring means urging said control piston into its first position to engage said second valve seat.

11. A brake accelerator as claimed in claim 10 wherein the volumes of said first and second control chambers, the diameters of said second and third valve seats and the force of said spring means are such that the fluid pressure from the brake line and auxiliary reservoir are drawn off cyclically at a predetermined frequency.

* * * * *